US011740147B2

(12) United States Patent
Ishizaki et al.

(10) Patent No.: US 11,740,147 B2
(45) Date of Patent: Aug. 29, 2023

(54) TRIAXIAL FORCE SENSOR

(71) Applicants: HONDA MOTOR CO., LTD., Tokyo (JP); The University of British Columbia, Vancouver (CA)

(72) Inventors: Ryusuke Ishizaki, Wako (JP); Mirza Saquib Sarwar, Vancouver (CA); John D. W. Madden, Vancouver (CA)

(73) Assignees: Honda Motir Co., Ltd., Tokyo (JP); The University of British Columbia, Vancouver (CA)

( * ) Notice: Subject to any disclaimer, the term of this patent is extended or adjusted under 35 U.S.C. 154(b) by 0 days.

(21) Appl. No.: 17/579,076

(22) Filed: Jan. 19, 2022

(65) Prior Publication Data

US 2022/0228937 A1 Jul. 21, 2022

(30) Foreign Application Priority Data

Jan. 20, 2021 (JP) ................................ 2021-006939

(51) Int. Cl.
*G01L 5/165* (2020.01)
*G01L 1/14* (2006.01)

(52) U.S. Cl.
CPC ............... *G01L 5/165* (2013.01); *G01L 1/14* (2013.01)

(58) Field of Classification Search
CPC ............ G01L 1/146; G01L 1/14; G01L 5/165
See application file for complete search history.

(56) References Cited

U.S. PATENT DOCUMENTS

| 4,719,538 | A | * | 1/1988 | Cox | ..................... G01D 5/2417 361/283.2 |
| 4,836,033 | A | * | 6/1989 | Seitz | ....................... G01L 1/146 361/291 |
| 5,095,762 | A | * | 3/1992 | Holm-Kennedy | .......................... G01P 15/0802 73/866.5 |
| 7,343,801 | B2 | * | 3/2008 | Kapser | .................... G01P 15/18 73/514.32 |
| 7,395,721 | B2 | * | 7/2008 | Taniguchi | ............... G01L 1/142 73/780 |
| 7,398,587 | B2 | * | 7/2008 | Morimoto | ............ H01H 25/041 324/686 |
| 7,710,126 | B2 | * | 5/2010 | Morimoto | ............... G01L 5/165 324/661 |

(Continued)

FOREIGN PATENT DOCUMENTS

JP 2014-055985 A 3/2014

*Primary Examiner* — Tran M. Tran
(74) *Attorney, Agent, or Firm* — Carrier, Shende & Associates P.C.; Joseph P. Carrier; Jeffrey T. Gedeon

(57) ABSTRACT

A triaxial force sensor 1 includes nine first electrodes 11 to 19, and nine second electrodes 21 to 29 attached to an electrode support 10 in such a manner that the electrode support 10 is interposed between the nine first electrodes 11 to 19 and the nine second electrodes 21 to 29. A pair of first electrodes 14 and 16 are arranged such that a straight line connecting the two is orthogonal to a straight line connecting a pair of first electrodes 12 and 18, and the second electrodes 22, 24, 26, and 28 are arranged such that the respective halves overlap the first electrodes 12, 14, 16, and 18 in plan view. The sensor has a number of components and size, thereby allowing a reduction in manufacturing cost, in the case of detecting forces in orthogonal triaxial directions.

2 Claims, 10 Drawing Sheets

(56) References Cited

U.S. PATENT DOCUMENTS

| | | | | |
|---|---|---|---|---|
| 7,757,571 B2* | 7/2010 | Hirabayashi | G01L 1/26 | 73/862.626 |
| 8,250,926 B2* | 8/2012 | Yang | G01L 1/142 | 73/715 |
| 8,733,177 B2* | 5/2014 | Kung | G01L 1/142 | 73/862.626 |
| 8,904,885 B2* | 12/2014 | Ikebe | G06F 3/0338 | 73/862.626 |
| 9,003,898 B2* | 4/2015 | Moon | G01L 5/165 | 345/173 |
| 9,007,072 B2* | 4/2015 | Koo | G01L 5/165 | 324/660 |
| 9,347,838 B2* | 5/2016 | Chen | G01L 1/142 | |
| 9,423,308 B2* | 8/2016 | Brookhuis | G01L 1/148 | |
| 9,453,773 B2* | 9/2016 | Choi | G01L 3/106 | |
| 9,568,379 B2* | 2/2017 | Lim | G01L 5/165 | |
| 9,599,524 B2* | 3/2017 | Surapaneni | G01L 5/165 | |
| 9,638,594 B2* | 5/2017 | Sakano | G01L 5/165 | |
| 9,700,258 B2* | 7/2017 | Jiang | G01L 1/127 | |
| 9,823,141 B2* | 11/2017 | Li | G01L 1/146 | |
| 10,267,690 B2* | 4/2019 | Wu | G01L 5/165 | |
| 10,451,493 B2* | 10/2019 | Mathieu | G01D 5/2412 | |
| 10,495,528 B2* | 12/2019 | Choi | G01L 5/228 | |
| 10,635,219 B2* | 4/2020 | Chou | G06F 3/0446 | |
| 10,677,672 B2* | 6/2020 | Sakano | G01L 5/165 | |
| 10,732,056 B2* | 8/2020 | Okada | G01L 5/165 | |
| 10,760,982 B2* | 9/2020 | Watazu | G01L 1/146 | |
| 10,760,986 B2* | 9/2020 | Sakano | G01L 1/142 | |
| 11,009,414 B2* | 5/2021 | Nakayama | G01L 5/165 | |
| 11,402,281 B2* | 8/2022 | Sato | G01L 1/142 | |
| 2011/0005338 A1* | 1/2011 | Okada | G01L 5/0061 | 73/862.043 |
| 2011/0221457 A1* | 9/2011 | Takahashi | G01L 5/165 | 324/686 |
| 2012/0180575 A1* | 7/2012 | Sakano | G01L 5/165 | 73/862.626 |
| 2013/0093437 A1* | 4/2013 | Koo | G01R 27/2605 | 324/660 |
| 2017/0191819 A1* | 7/2017 | O'Brien | G01L 5/165 | |
| 2018/0032181 A1* | 2/2018 | Frey | G06F 3/0445 | |
| 2019/0094087 A1* | 3/2019 | Rudy | G01L 1/146 | |
| 2019/0360879 A1* | 11/2019 | Iwatake | H05K 1/181 | |
| 2020/0141818 A1* | 5/2020 | Bao | G01L 9/12 | |
| 2021/0278300 A1* | 9/2021 | Bao | B25J 13/084 | |
| 2021/0333164 A1* | 10/2021 | Sarwar | G01L 1/148 | |
| 2021/0396605 A1* | 12/2021 | Vardoulis | G01L 1/148 | |
| 2022/0252475 A1* | 8/2022 | Hussein | G01L 5/228 | |
| 2022/0364938 A1* | 11/2022 | Ogawa | G01L 5/166 | |
| 2022/0412825 A1* | 12/2022 | Tsukamoto | G06F 3/041 | |

* cited by examiner

FIG.3

| | C1 | C2 | C3 | C4 | C5 | C6 | C7 | C8 | C9 |
|---|---|---|---|---|---|---|---|---|---|
| DOWNWARD FORCE | Up | Up | Up | Up | Up | Up | Up | Up | Up |
| LEFTWARD FORCE | — | — | — | Up | — | Down | — | — | — |
| RIGHTWARD FORCE | — | — | — | Down | — | Up | — | — | — |
| FORWARD FORCE | — | Down | — | — | — | — | — | Up | — |
| REARWARD FORCE | — | Up | — | — | — | — | — | Down | — |

TRIAXIAL FORCE SENSOR

BACKGROUND

Technical Field

The present invention relates to a triaxial force sensor.

Related Art

Conventionally, a triaxial force sensor described in JP 2014-55985 A is known. The triaxial force sensor is configured to detect forces in orthogonal triaxial directions including distributed loads, and is equipped with a large number of planarly arranged stress detection elements. Each of the stress detection elements is of the piezoelectric element type, and is equipped with a pressing force detection element, one pair of shearing force detection elements, and the other pair of shearing force detection elements. The pair of shearing force detection elements and the other pair of shearing force detection elements are arranged in the shape of a cross in plan view so that the pressing force detection element is located at the center of the cross. The pressing force detection element and the shearing force detection elements are composed of a pair of upper and lower electrodes or the like.

In the stress detection element, the pressing force is detected by the pressing force detection element, the shearing force acting in the arrangement direction of the one pair of shearing force detection elements is detected by the one pair of shearing force detection elements, and the shearing force acting in the arrangement direction of the other pair of shearing force detection elements is detected by the other pair of shearing force detection elements. Then, distributed loads are detected by the large number of stress detection elements.

SUMMARY

According to the conventional tactile sensor described above, in order to detect forces in orthogonal triaxial directions, it is necessary to planarly arrange a large number of stress detection elements each composed of a single pressing force detection element and four shearing force detection elements. As a result, the sensor is increased in size, and a large number of electrodes are required, so that the number of components is increased, leading to an increase in manufacturing cost.

The present invention has been made to address the above problem, and an object of the present invention is to provide a triaxial force sensor that can be reduced in the number of components and size, thereby allowing a reduction in manufacturing cost, in the case of detecting forces in orthogonal triaxial directions.

In order to achieve the above object, according to an aspect of the present invention, a triaxial force sensor for detecting forces in orthogonal triaxial directions on the basis of changes in capacitance between electrodes includes: a flexible member having dielectric properties and elasticity; a plurality of first electrodes attached to the flexible member, the first electrodes being spaced apart from each other along a predetermined plane; and a plurality of second electrodes spaced apart from each other along the predetermined plane, disposed in spaced face-to-face relation to the plurality of first electrodes, and attached to the flexible member with the flexible member interposed between the second electrodes and the first electrodes, the second electrodes being configured to detect capacitances between the second electrodes and the first electrodes. The plurality of first electrodes includes one pair of the first electrodes and the other pair of the first electrodes different from the one pair of first electrode. The one pair of first electrodes are along a first of two straight lines extending along the predetermined plane while being orthogonal to each other, and are arranged so that when a force in a direction along the first straight line acts on the flexible member, the area of each of the one pair of first electrodes overlapping the second electrode when viewed from the second electrode side changes. The other pair of first electrodes are along a second of the two straight lines, and are arranged so that when a force in a direction along the second straight line acts on the flexible member, the area of each of the other pair of first electrodes overlapping the second electrode when viewed from the second electrode side changes.

In this triaxial force sensor, the first electrodes are attached to the flexible member, spaced apart from each other along a predetermined plane, and the second electrodes are spaced apart from each other along the predetermined plane, disposed in spaced face-to-face relation to the first electrodes, and attached to the flexible member with the flexible member interposed between the second electrodes and the first electrodes. Thus, when the force in the direction orthogonal to the predetermined plane acts on the flexible member, the distances between the first electrodes and the second electrodes change, and the force can be detected on the basis of the resulting changes in capacitance.

Further, the plurality of first electrodes includes one pair of the first electrodes and the other pair of the first electrodes different from the one pair of first electrode. The one pair of first electrodes are along a first of two straight lines extending along the predetermined plane while being orthogonal to each other, and are arranged so that when a force in a direction along the first straight line acts on the flexible member, the area of each of the one pair of first electrodes overlapping the second electrode when viewed from the second electrode side changes. The other pair of first electrodes are along a second of the two straight lines, and are arranged so that when a force in a direction along the second straight line acts on the flexible member, the area of each of the other pair of first electrodes overlapping the second electrode when viewed from the second electrode side changes. Thus, when the force in the direction along the first straight line acts on the flexible member, the capacitance between each of the one pair of first electrodes and the second electrode changes as a result of the change in the overlapping area. As a result, the force in the direction along the first straight line, that is, the shearing force, can be detected on the basis of the changes in capacitance.

Furthermore, the other pair of first electrodes are along a second of the two straight lines, and are arranged so that when the force in the direction along the second straight line acts on the flexible member, the area of each of the other pair of first electrodes overlapping the second electrode when viewed from the second electrode side changes. Thus, when the force in the direction along the second straight line acts on the flexible member, the capacitance between each of the other pair of first electrodes and the second electrode changes as a result of the change in the overlapping area. As a result, the force in the direction along the second straight line, that is, the shearing force, can be detected on the basis of the changes in the capacitance. As described above, it is possible to detect the shearing forces in the orthogonal biaxial directions and the force in the direction orthogonal to the predetermined plane (that is, the forces in the orthogonal triaxial directions) using the eight electrodes. Thus, as compared with a conventional case where four shearing force detection elements and a single pressing force detection element (that is, a total of 10 electrodes) are required to detect forces in orthogonal triaxial directions, the number of components can be reduced and the sensor can be downsized, so that manufacturing cost can be reduced accordingly.

In the present invention, the plurality of first electrodes is preferably provided with a first central electrode located in a center when the plurality of first electrodes is viewed from the second electrode side, and a plurality of first peripheral electrodes arranged around the first central electrode and including the one pair of first electrodes and the other pair of first electrodes. The plurality of second electrodes is preferably provided with a second central electrode located in a center when the plurality of second electrodes is viewed toward the first electrodes and disposed to face the first central electrode, and a plurality of second peripheral electrodes arranged around the second central electrode and including four second electrodes that face the one pair of first electrodes and the other pair of first electrodes.

With this triaxial force sensor, it is possible to detect the force in the direction orthogonal to the predetermined plane on the basis of the change in capacitance between the first central electrode and the second central electrode. Further, it is possible to detect forces in the orthogonal triaxial directions on the basis of the changes in capacitance between the one pair of first electrodes, the other pair of first electrodes, and the four second electrodes that face the one pair of first electrodes and the other pair of first electrodes. That is, using a total of ten electrodes, the force in the direction orthogonal to the predetermined plane can be detected at five locations, and at the same time, the shearing forces in the orthogonal biaxial directions can be detected. As a result, the detection area of the force in the direction orthogonal to the predetermined plane can be increased as compared with the conventional case where the pressing force can be detected only at one location using a total of ten electrodes.

In the present invention, the plurality of second electrodes is preferably provided with a second central electrode located in a center when the plurality of second electrodes is viewed toward the first electrodes, and a plurality of second peripheral electrodes arranged around the second central electrode. The plurality of first electrodes is preferably provided with the one pair of first electrodes and the other pair of first electrodes partially overlapping the second central electrode when the plurality of first electrodes is viewed from the second electrode side, and a plurality of first peripheral electrodes facing the plurality of second peripheral electrodes.

With this triaxial force sensor, the force in the direction orthogonal to the predetermined plane can be detected at four locations using the single second central electrode and the four first electrodes, and at the same time, the shearing forces in the orthogonal biaxial directions can be detected. As a result, the detection area of the force in the direction orthogonal to the predetermined plane can be increased as compared with the conventional case where the pressing force can be detected only at one location using a total of ten electrodes. Additionally, the force in the direction orthogonal to the predetermined plane can be further detected at a plurality of locations using the plurality of second peripheral electrodes and the plurality of first peripheral electrodes, so that the detection area of the force in the direction orthogonal to the predetermined plane can be further increased.

In the present invention, the plurality of second peripheral electrodes preferably includes a pair of the second peripheral electrodes, and the pair of second peripheral electrodes are preferably arranged along the second straight line with the first straight line between the pair of second peripheral electrodes when viewed toward the plurality of first peripheral electrodes.

In this triaxial force sensor, the plurality of second peripheral electrodes includes the pair of the second peripheral electrodes, and the pair of second peripheral electrodes are arranged along the second straight line with the first straight line between the pair of second peripheral electrodes when viewed toward the plurality of first peripheral electrodes. Thus, on the basis of the changes in capacitance between the pair of second peripheral electrodes and the first peripheral electrodes facing the pair of second peripheral electrodes, it is possible to detect the force in the direction orthogonal to the predetermined plane acting on one of the pair of second peripheral electrodes, and the force in the direction orthogonal to the predetermined plane acting on the other of the pair of second peripheral electrodes. As a result, the moment acting on the flexible member can be detected on the basis of the difference between the two forces and the distance from the first straight line.

BRIEF DESCRIPTION OF DRAWINGS

FIG. 3 shows changes in capacitance when a force acts on the triaxial force sensor;

DETAILED DESCRIPTION

Hereinafter, a triaxial force sensor according to a first embodiment of the present invention will be described with reference to the drawings. The triaxial force sensor 1 shown in FIG. 1 according to the present embodiment is connected to a force detection device 40 via an electric wire (not shown). As will be described later, the force detection device 40 detects the forces in orthogonal triaxial directions acting on the triaxial force sensor 1 on the basis of the detection results of capacitances C1 to C9 by the triaxial force sensor 1.

Figure 1:
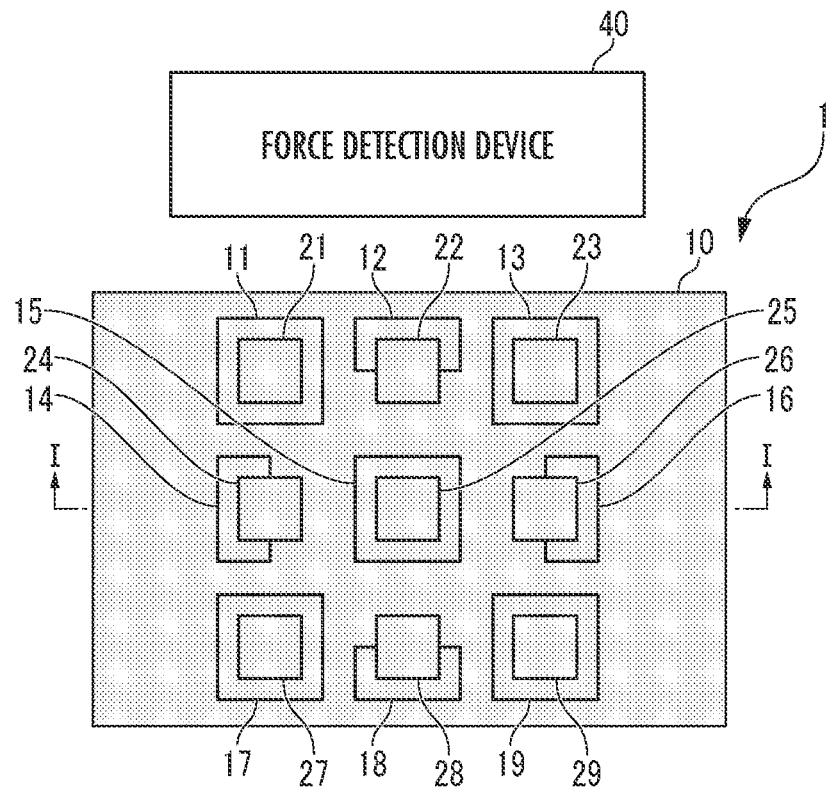
FIG. 1 is a plan view illustrating a configuration of a triaxial force sensor and the like according to a first embodiment of the present invention.
Figure 2:
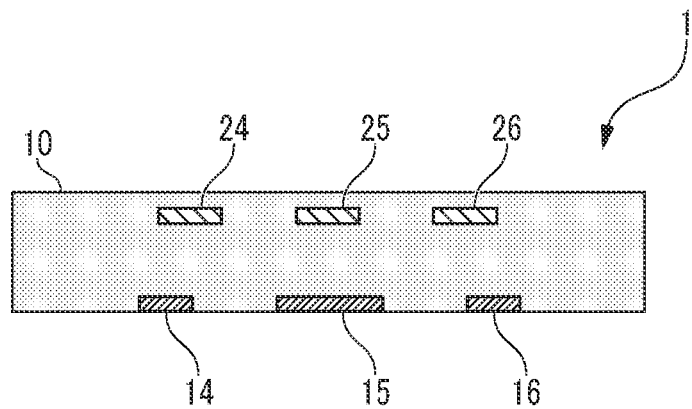
FIG. 2 is a cross-sectional view taken along line I-I in FIG. 1.

As shown in FIGS. 1 and 2, the triaxial force sensor 1 according to the present embodiment includes an electrode support 10, nine first electrodes 11 to 19, and nine second electrodes 21 to 29.

Note that, in the following description, for convenience, the left side of FIG. 1 is referred to as "left", the right side of FIG. 1 is referred to as "right", the lower side of FIG. 1 is referred to as "front", the upper side of FIG. 1 is referred to as "rear", the front side of FIG. 1 is referred to as "upper", and the back side of FIG. 1 is referred to as "lower".

The electrode support 10 is formed from translucent silicon rubber having dielectric properties and elasticity (or flexibility), and has a solid rectangular parallelepiped shape. It should be noted that in the present embodiment, the electrode support 10 corresponds to a flexible member.

Each of the nine first electrodes 11 to 19 is a plate-shaped flexible electrode, and is connected to the force detection device 40 via a flexible electric wire (not shown). Further, each of the nine first electrodes 11 to 19 is attached to the electrode support 10 in a state flush with the lower surface of the electrode support 10 (see FIG. 2).

The five first electrodes 11, 13, 15, 17, and 19 are formed into squares having the same size in plan view, and the remaining four first electrodes 12, 14, 16, and 18 are each formed into a rectangle having half the size of the first electrode 11 in plan view. In addition, the nine first electrodes 11 to 19 are arranged such that their respective sides are parallel to each other in plan view.

Further, as for the five first electrodes 11, 13, 15, 17, and 19, in plan view, the centers of the four first electrodes 11, 13, 17, and 19 form a square, and the first electrode 15 is located at the center of the square. It should be noted that in the present embodiment, the first electrode 15 corresponds to a first central electrode, and the first electrodes 11 to 14 and 16 to 19 correspond to first peripheral electrodes.

Meanwhile, the first electrode 12 is placed at the center position between the two first electrodes 11 and 13 in a state in which the front edge thereof coincides with a straight line that passes through the centers of the two first electrodes 11 and 13. In addition, the first electrode 14 is placed at the center position between the two first electrodes 11 and 17 in a state in which the right edge thereof coincides with a straight line that passes through the centers of the two first electrodes 11 and 17.

Furthermore, the first electrode 16 is placed at the center position between the two first electrodes 13 and 19 in a state in which the left edge thereof coincides with a straight line that passes through the centers of the two first electrodes 13 and 19. Meanwhile, the first electrode 18 is placed at the center position between the two first electrodes 17 and 19 in a state in which the rear edge thereof coincides with a straight line that passes through the centers of the two first electrodes 17 and 19.

As described above, the triaxial force sensor 1 is configured so that the straight line connecting the centers of the pair of front and rear first electrodes 18 and 12 is orthogonal to the straight line connecting the centers of the pair of left and right first electrodes 14 and 16, and the distance between the centers of the pair of front and rear first electrodes 18 and 12 and the distance between the centers of the pair of left and right first electrodes 14 and 16 are the same. It should be noted that in the present embodiment, either the pair of front and rear first electrodes 18 and 12 or the pair of left and right first electrodes 14 and 16 corresponds to one pair of first electrodes, and the other corresponds to the other pair of first electrodes.

Meanwhile, each of the nine second electrodes 21 to 29 is a plate-shaped flexible electrode, and is connected to the force detection device 40 via a flexible electric wire (not shown). Each of the nine second electrodes 21 to 29 is formed into a square smaller than the first electrode 11 in plan view, and embedded in the electrode support 10 in an orientation parallel to the upper surface of the electrode support 10 at a position below the upper surface of the electrode support 10 by a predetermined distance (see FIG. 2).

The five second electrodes 21, 23, 25, 27, and 29 are arranged concentrically with the five first electrodes 11, 13, 15, 17, and 19, respectively, in plan view. That is, the centers of the four second electrodes 21, 23, 27, and 29 form a square, and the second electrode 25 is located at the center of the square.

Further, in plan view, the second electrode 22 is placed at the center position between the two second electrodes 21 and 23 in a state in which the rear half thereof overlaps the first electrode 12. Furthermore, in plan view, the second electrode 24 is placed at the center position between the two second electrodes 21 and 27 in a state in which the left half thereof overlaps the first electrode 14.

Meanwhile, in plan view, the second electrode 26 is placed at the center position between the two second electrodes 23 and 29 in a state in which the right half thereof overlaps the first electrode 16. In addition, the second electrode 28 is placed at the center position between the two second electrodes 27 and 29 in a state in which the lower half thereof overlaps the first electrode 18.

As described above, the triaxial force sensor 1 is configured so that the straight line connecting the centers of the two second electrodes 22 and 28 is orthogonal to the straight line connecting the centers of the two second electrodes 24 and 26, and the distance between the centers of the two second electrodes 22 and 28 and the distance between the centers of the two second electrodes 24 and 26 are the same. It should be noted that in the present embodiment, the second electrode 25 corresponds to a second central electrode, and the second electrodes 21 to 24 and 26 to 29 correspond to second peripheral electrodes.

Meanwhile, the force detection device 40 is configured by combining an electric circuit and a microcomputer. In the force detection device 40, by applying a voltage between the two first electrode 11 and second electrode 21, the capacitance C1 between the electrodes 11 and 21 is detected, and by applying a voltage between the two first electrode 12 and second electrode 22, the capacitance C2 between the electrodes 12 and 22 is detected.

Furthermore, by the same method as described above, the capacitance C3 is detected as the capacitance between the two first electrode 13 and second electrode 23, the capacitance C4 is detected as the capacitance between the two first electrode 14 and second electrode 24, and the capacitance C5 is detected as the capacitance between the two first electrode 15 and second electrode 25.

Additionally, the capacitance C6 is detected as the capacitance between the two first electrode 16 and second electrode 26, the capacitance C7 is detected as the capacitance between the two first electrode 17 and second electrode 27, the capacitance C8 is detected as the capacitance between the two first electrode 18 and second electrode 28, and the capacitance C9 is detected as the capacitance between the two first electrode 19 and second electrode 29.

The capacitances C1 to C9 change as shown in FIG. 3 when forces in the orthogonal triaxial directions act on the triaxial force sensor 1. It should be noted that in FIG. 3, an increase in capacitance is referred to as "Up", and a decrease in capacitance is referred to as "Down". As shown in the figure, when a downward force (that is, a load) acts on the triaxial force sensor 1, all of the nine capacitances C1 to C9 increase.

Figure 4A:
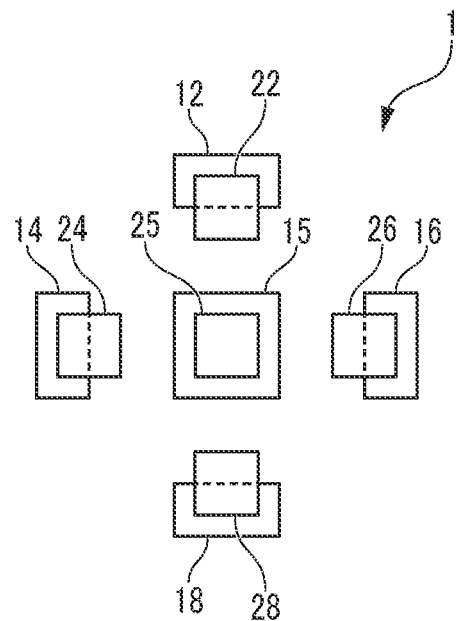
FIG. 4A is a plan view illustrating a positional relationship between first and second electrodes when a shearing force does not act on the triaxial force sensor.

Further, when a leftward force (leftward shearing force) acts on the triaxial force sensor 1, the capacitance C4 increases and the capacitance C6 decreases. This is due to the following reasons. That is, if the leftward force Fx acts on the triaxial force sensor 1 as shown in FIG. 4B from the state shown in FIG. 4A in which no force acts on the triaxial force sensor 1, the overlapping area of the two first electrode 14 and second electrode 24 aligned in the vertical direction increases by the amount shown by the hatching in FIG. 4B, and accordingly, the capacitance C4 increases.

Figure 4B:
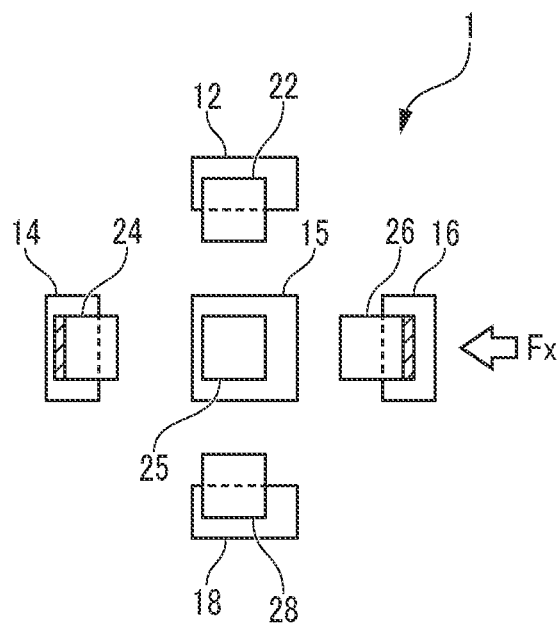
FIG. 4B is a plan view illustrating a positional relationship between the first and second electrodes when a shearing force acts on the triaxial force sensor.

At the same time, the overlapping area of the two first electrode 16 and second electrode 26 aligned in the vertical direction decreases by the amount shown by the hatching in FIG. 4B, and accordingly, the capacitance C6 decreases. In addition, the overlapping area of two first and second electrodes aligned in the vertical direction other than the above does not change, resulting in a state in which the capacitance does not change.

Meanwhile, when a rightward force (rightward shearing force) acts on the triaxial force sensor 1, the capacitance C4 decreases and the capacitance C6 increases, contrary to the case where the leftward force acts.

Furthermore, when a forward force (forward shearing force) acts on the triaxial force sensor 1, the overlapping area of the two first electrode 12 and second electrode 22 aligned in the vertical direction decreases, and the overlapping area of the two first electrode 18 and second electrode 28 aligned in the vertical direction increases. As a result, the capacitance C2 decreases and the capacitance C8 increases.

In addition, when a rearward force (rearward shearing force) acts on the triaxial force sensor 1, the overlapping area of the two first electrode 12 and second electrode 22 increases, and the overlapping area of the two first electrode 18 and second electrode 28 decreases. As a result, the capacitance C2 increases and the capacitance C8 decreases.

On the basis of the above principle, in the force detection device 40, the nine capacitances C1 to C9 are detected using the triaxial force sensor 1, and the downward force (load) acting on the triaxial force sensor 1, the shearing force acting in the left-right direction, and the shearing force acting in the front-rear direction are calculated by an arithmetic expression (not shown) on the basis of the nine capacitances C1 to C9. That is, the forces in the orthogonal triaxial directions acting on the triaxial force sensor 1 are detected.

As described above, the triaxial force sensor 1 according to the first embodiment is configured by the nine first electrodes 11 to 19 being attached to the electrode support 10 in a state flush with the bottom surface of the electrode support 10, and the nine second electrodes 21 to 29 being attached to the electrode support 10 in an orientation parallel to the nine first electrodes 11 to 19. Therefore, when a downward force acts on the electrode support 10, the distances between the nine second electrodes 21 to 29 and the nine first electrodes 11 to 19 change, and on the basis of the resulting changes in the capacitances C1 to C9, the force acting on the electrode support 10 can be detected at a total of nine locations. That is, even when a distributed load acts on the electrode support 10, the distributed load can be detected.

In addition, when leftward and rightward shearing forces act on the triaxial force sensor 1, the capacitance C4 between the two first electrode 14 and second electrode 24 and the capacitance C6 between the two first electrode 16 and second electrode 26 change. Similarly, when forward and rearward shearing forces act on the triaxial force sensor 1, the capacitance C2 between the two first electrode 12 and second electrode 22 and the capacitance C8 between the two first electrode 18 and second electrode 28 change. Therefore, it is possible to detect the shearing forces in the front-rear direction and the left-right direction on the basis of the changes in the capacitances C2, C4, C6, and C8.

Furthermore, the forces in the orthogonal triaxial directions can be detected using a total of eight electrodes (the first electrodes 12, 14, 16, and 18 and the second electrodes 22, 24, 26, and 28). Therefore, as compared with the conventional case where a total of ten electrodes are required, the number of components can be reduced and the sensor can be downsized, so that manufacturing cost can be reduced accordingly.

Additionally, with the triaxial force sensor 1, it is possible to detect a moment around the straight lines extending in the front-rear direction and the left-right direction through the center of the second electrode 25 according to the principle described later.

Figure 5:
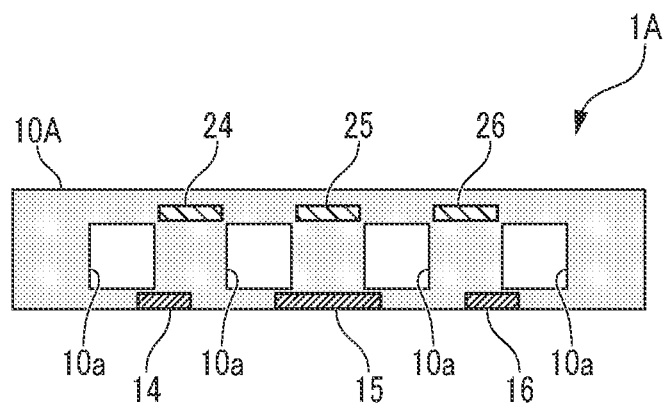
FIG. 5 shows a modification of the triaxial force sensor.

It should be noted that the first embodiment is an example in which the triaxial force sensor 1 is provided with the solid electrode support 10, but alternatively, as shown in FIG. 5, a triaxial force sensor 1A may be provided with a hollow electrode support 10A (flexible member). The triaxial force sensor 1A has a plurality of voids 10a formed in the interior of the electrode support 10A, and configured so that the first electrodes 11 to 19 and the second electrodes 21 to 29 are not short-circuited when a downward force is applied.

Since the triaxial force sensor 1A has the voids 10a formed in the electrode support 10A, when a shearing force acts on the electrode support 10A, the displacement in the left-right direction and the front-rear direction between the two first and second electrodes aligned in the vertical direction is more likely to occur than the electrode support 10 of the first embodiment. Thus, the triaxial force sensor 1A allows a further improvement in the detection sensitivity of shearing force than the triaxial force sensor 1 according to the first embodiment.

Figure 6:
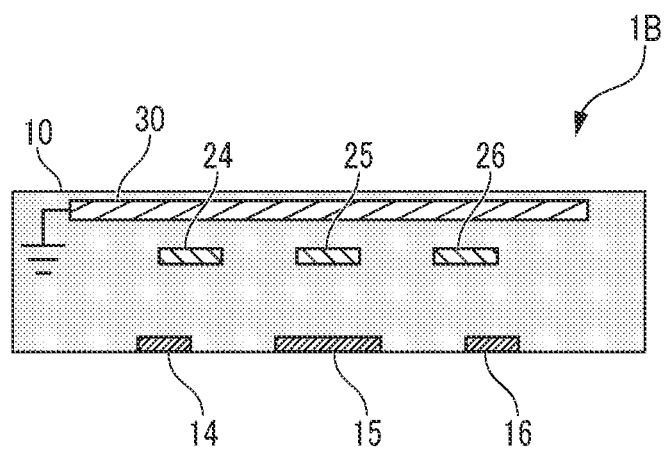
FIG. 6 shows the triaxial force sensor provided with a shield layer.

Further, a triaxial force sensor 1B may be configured as shown in FIG. 6. The triaxial force sensor 1B is provided with a shield layer 30, and the shield layer 30 is embedded in the electrode support 10, above the second electrode 21 to 29. With the triaxial force sensor 1B, the effect of the shield layer 30 can suppress the influence of external noise and improve the accuracy of triaxial force detection.

Figure 7:
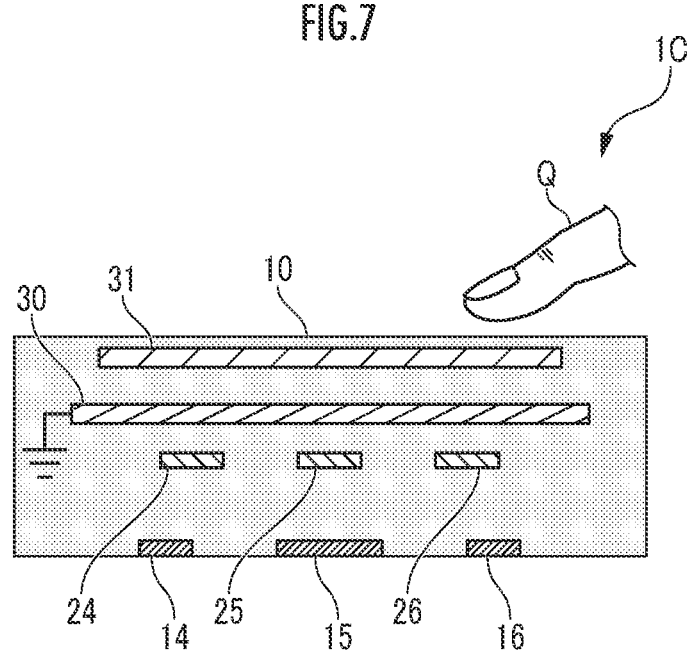
FIG. 7 shows the triaxial force sensor provided with an electrode for detecting the approach of an object.

Furthermore, a triaxial force sensor 1C may be configured as shown in FIG. 7. The triaxial force sensor 1C is also provided with an electrode 31 above the shield layer 30. The electrode 31 is configured to detect the approach of an object such as a finger Q, and is connected to an oscillation circuit and a force detection device (both not shown). The electrode 31 generates an electric field when driven by the oscillation circuit. The force detection device detects the approach of an object on the basis of the change in capacitance of the electrode 31 when the object enters the electric field generated by the electrode 31. As described above, with the triaxial force sensor 1C, it is possible to detect the approach of an object in addition to detecting the triaxial forces.

Figure 8:
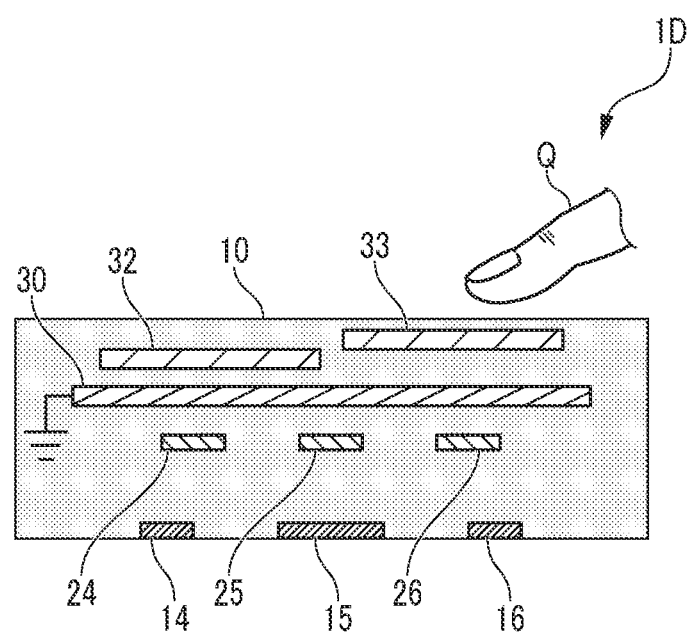
FIG. 8 shows the triaxial force sensor provided with two electrodes for detecting the approach of an object.

Further, a triaxial force sensor 1D may be configured as shown in FIG. 8. The triaxial force sensor 1D is also provided with two electrodes 32 and 33 above the shield layer 30. The electrodes 32 and 33 are configured to detect the approach of an object such as a finger Q, and are connected to a force detection device (not shown). The force detection device applies a voltage to the electrodes 32 and 33, and detects the approach of the object on the basis of the change in capacitance between the electrodes 32 and 33. As described above, with the triaxial force sensor 1D, similarly to the triaxial force sensor 1C described above, it is possible to detect the approach of an object in addition to detecting the triaxial forces.

It should be noted that although the first embodiment is an example in which the electrode support 10 formed from silicon rubber is used as a flexible member, the flexible member in the present invention is not limited thereto, but may be anything that has dielectric properties and elasticity. For example, a dielectric such as a conductive resin such as a thiophene-based conductive polymer or PSS, PVC gel, polyvinylidene fluoride (PVDF), polydimethylsiloxane (PDMS), a silicon-based resin, a urethane-based resin, or epoxy-based resin, or a composite material of any combination thereof may be used as a flexible member.

Further, in the first embodiment, the rectangular parallelepiped electrode support 10 is used as the flexible member, but alternatively, flexible members having various shapes, such as an oval coin shape and a cylindrical shape, may be used.

Meanwhile, the first embodiment is an example in which the five first electrodes 11, 13, 15, 17, and 19 and the five second electrodes 21, 23, 25, 27, and 29 are square in plan view, but alternatively, polygonal ones other than square or circular ones in plan view may be used. In that case, it is sufficient that the overlap area between the five second electrodes 21, 23, 25, 27, and 29 and the five first electrodes 11, 13, 15, 17, and 19 does not change when a shearing force acts on the electrode support 10.

Furthermore, the first embodiment is an example in which the four first electrodes 12, 14, 16, and 18 have a rectangular shape in plan view, but alternatively, shapes having a symmetrical shape when viewed in plan view may be used.

In addition, the first embodiment is an example in which the four second electrodes 22, 24, 26, and 28 are square in plan view, but alternatively, rectangular ones other than square in plan view may be used, as long as the shape has symmetry in plan view.

Meanwhile, the first embodiment is an example in which nine first electrodes are used as a plurality of first electrodes, but alternatively, eight or fewer or ten or more first electrodes may be used as a plurality of first electrodes. Further, the eight first peripheral electrodes are used as a plurality of first peripheral electrodes in the example, but alternatively, seven or fewer or nine or more first peripheral electrodes may be used as a plurality of first peripheral electrodes.

In addition, the first embodiment is an example in which nine second electrodes are used as a plurality of second electrodes, but alternatively, eight or fewer or ten or more second electrodes may be used as a plurality of second electrodes. Moreover, the eight second peripheral electrodes are used as a plurality of second peripheral electrodes in the example, but alternatively, seven or fewer or nine or more second peripheral electrodes may be used as a plurality of second peripheral electrodes.

Hereinafter, a triaxial force sensor according to a second embodiment of the present invention will be described with reference to the drawings. As shown in FIGS. 9 to 12, the triaxial force sensor 100 according to the second embodiment differs from the triaxial force sensor 1 according to the first embodiment in that the triaxial force sensor 100 is provided with twelve first electrodes 111 to 122 and nine second electrodes 201 to 209 in place of the first electrodes 11 to 19 and the second electrodes 21 to 29, and therefore the first electrodes 111 to 122 and the second electrodes 201 to 208 will be mainly described below. The same components as those of the first embodiment are denoted by the same reference signs, and a description thereof will not be given here.

Figure 11:
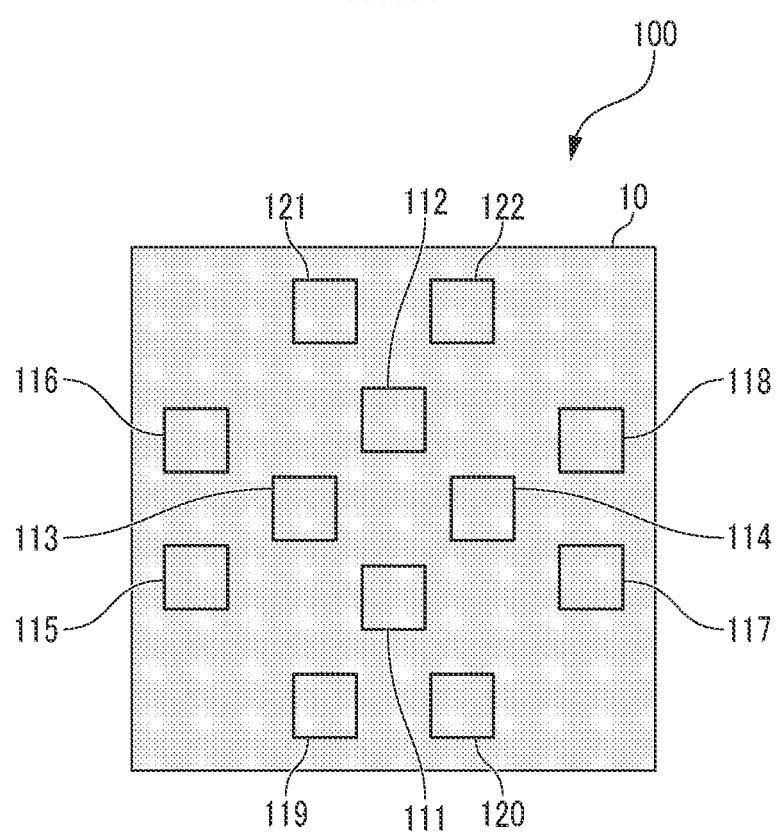
FIG. 11 is a cross-sectional view taken along line in FIG. 10.

Each of the twelve first electrodes 111 to 122 is a plate-shaped flexible electrode, and is connected to the force detection device 40 via a flexible electric wire (not shown). Further, as shown in FIG. 11, the twelve first electrodes 111 to 122 are formed into squares having the same size as each other in plan view, and are arranged such that their respective sides are parallel to each other. In addition, the twelve first electrodes 111 to 122 are arranged at positions above the bottom surface of the electrode support 10 by a predetermined distance, and are embedded in the electrode support 10 in an orientation parallel to the bottom surface of the electrode support 10 (see FIG. 10).

Figure 12:
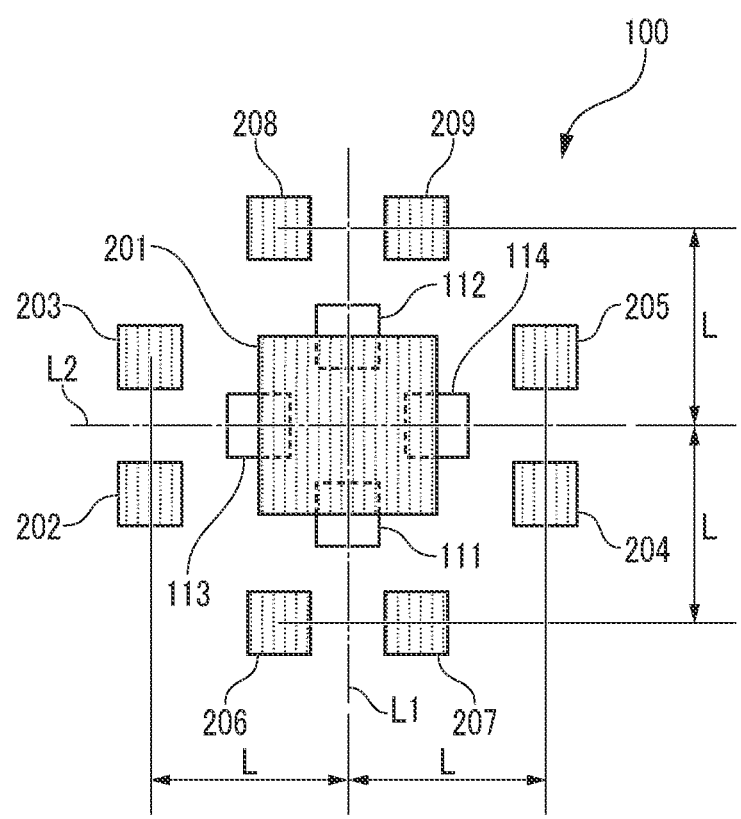
FIG. 12 is a plan view illustrating the arrangement of first and second electrodes.

Among the twelve first electrodes 111 to 122, the four first electrodes 111 to 114 are arranged in the vicinity of the central portion of the electrode support 10 in plan view such that a straight line L1 connecting the centers of the pair of front and rear first electrodes 111 and 112 is orthogonal to a straight line L2 connecting the centers of the pair of left and right first electrodes 113 and 114 at the center point of the electrode support 10, and the distance between the centers of the front and rear first electrodes 111 and 112 and the distance between the centers of the left and right first electrodes 113 and 114 are the same (see FIG. 12).

The four first electrodes 111 to 114 are arranged in such a manner that the second electrode 201 overlaps their respective halves in plan view. That is, the second electrode 20 is disposed in such a manner as to overlap the rear half of the first electrode 111, the front half of the first electrode 112, the right half of the first electrode 113, and the left half of the first electrode 114.

Further, the remaining eight first electrodes 115 to 122 surround the four first electrodes 111 to 114 and are arranged so as to be point-symmetric with respect to the center point of the electrode support 10 in plan view. More specifically, the two first electrodes 115 and 116 are separated leftward from the straight line L1 by a predetermined distance L, and are arranged at equal intervals in the front-rear direction with respect to the straight line L2. In addition, the two first electrodes 117 and 118 are arranged in line symmetry with the two first electrodes 115 and 116 with the straight line L1 therebetween.

Furthermore, the two first electrodes 119 and 120 are separated forward from the straight line L2 by a predetermined distance L, and are arranged at equal intervals in the left-right direction with respect to the straight line L1. In addition, the two first electrodes 121 and 122 are arranged in line symmetry with the two first electrodes 119 and 120 with the straight line L2 therebetween. It should be noted that in the present embodiment, either the pair of front and rear first electrodes 111 and 112 or the pair of left and right first electrodes 113 and 114 corresponds to one pair of first electrodes, the other corresponds to the other pair of first electrodes, and the first electrode 115 to 122 correspond to first peripheral electrodes.

Meanwhile, each of the nine second electrodes 201 to 209 is a plate-shaped flexible electrode, and is connected to the force detection device 40 via a flexible electric wire (not shown). In addition, the nine second electrodes 201 to 209 are arranged at positions below the upper surface of the electrode support 10 by a predetermined distance, and are embedded in the electrode support 10 in an orientation parallel to the upper surface of the electrode support 10 (see FIG. 10).

Figure 9:
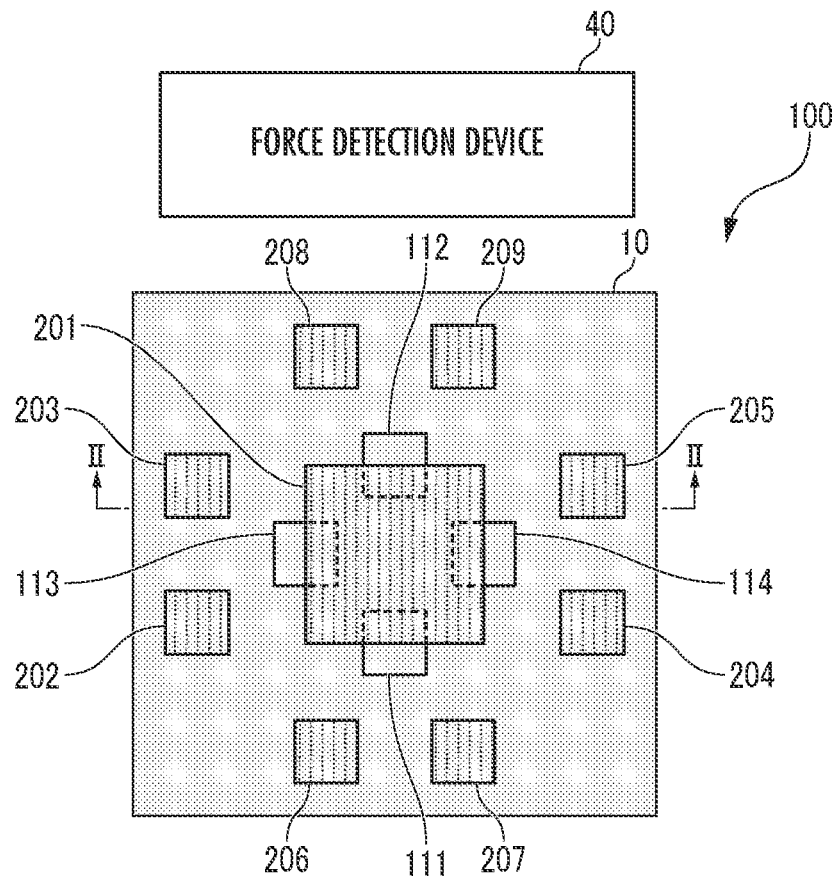
FIG. 9 is a plan view illustrating a configuration of a triaxial force sensor and the like according to a second embodiment.
Figure 10:
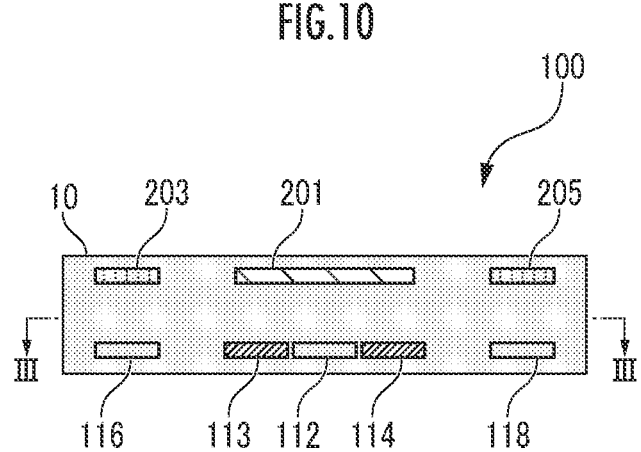
FIG. 10 is a cross-sectional view taken along line in FIG. 9.

Furthermore, as shown in FIG. 9, the nine second electrodes 201 to 209 are formed into squares in plan view, and are arranged in such a manner that their respective sides are parallel to each other and also parallel to the sides of the first electrodes 111 to 122.

Among the nine second electrodes 201 to 209, the second electrode 201 is centrally placed and has a larger size than the other second electrodes 202 to 209. As described above, the second electrode 201 is disposed in such a manner as to overlap the halves of the four first electrodes 111 to 114 in plan view.

Furthermore, the eight second electrodes 202 to 209 are disposed so as to surround the second electrode 201 in plan view, have the same size as the first electrode 111 to 122, and are arranged concentrically with the eight first electrodes 115 to 122. That is, the eight second electrodes 202 to 209 are arranged so as to entirely overlap the eight first electrodes 115 to 122 in plan view. It should be noted that in the present embodiment, the second electrode 201 corresponds to a second central electrode, and the second electrodes 202 to 209 correspond to second peripheral electrodes.

As described above, the triaxial force sensor 100 according to the second embodiment is configured by the twelve first electrodes 111 to 122 being attached to the electrode support 10 in an orientation parallel to the upper surface of the electrode support 10, and the nine second electrodes 201 to 209 being attached to the electrode support 10 in spaced face-to-face relation to the twelve first electrodes 111 to 122. Furthermore, the single second electrode 201 is disposed in such a manner that the halves of the four first electrodes 111 to 114 overlap the second electrode 201 in plan view.

Therefore, when a downward force acts on the electrode support 10, the distances between the nine second electrodes 201 to 209 and the twelve first electrodes 111 to 122 change, and on the basis of the resulting changes in capacitance, the downward force acting on the electrode support 10 can be detected at a total of twelve locations. That is, even when a distributed load acts on the electrode support 10, the distributed load can be detected.

Further, in plan view, the four first electrodes 111 to 114 are arranged such that the straight line L1 connecting the centers of the pair of front and rear first electrodes 111 and 112 is orthogonal to the straight line L2 connecting the centers of the pair of left and right first electrodes 113 and 114 at the center point of the electrode support 10, and the distance between the centers of the front and rear first electrodes 111 and 112 and the distance between the centers of the left and right first electrodes 113 and 114 are the same.

Therefore, when a shearing force acts on the electrode support 10, as the electrode support 10 is elastically deformed, the overlapping area of the surfaces facing each other between the four first electrodes 111 to 114 and the second electrode 201 changes, resulting in changes in capacitance. Thus, the shearing forces in the orthogonal biaxial directions can be detected on the basis of the changes in capacitance.

Furthermore, the forces in the orthogonal triaxial directions can be detected using a total of five electrodes (the first electrodes 111 to 114 and the second electrode 201). Therefore, as compared with the conventional case where a total of ten electrodes are required, the number of components can be reduced and the sensor can be downsized, so that manufacturing cost can be reduced accordingly.

Further, with the triaxial force sensor 100, when a straight line extending in the front-rear direction through the center of the second electrode 201 in the left-right direction and the vertical direction and a straight line extending in the left-right direction through the center of the second electrode 201 in the front-rear direction and the vertical direction are assumed, it is also possible to detect moments around the two straight lines. Hereinafter, the principle will be described.

Figure 13:
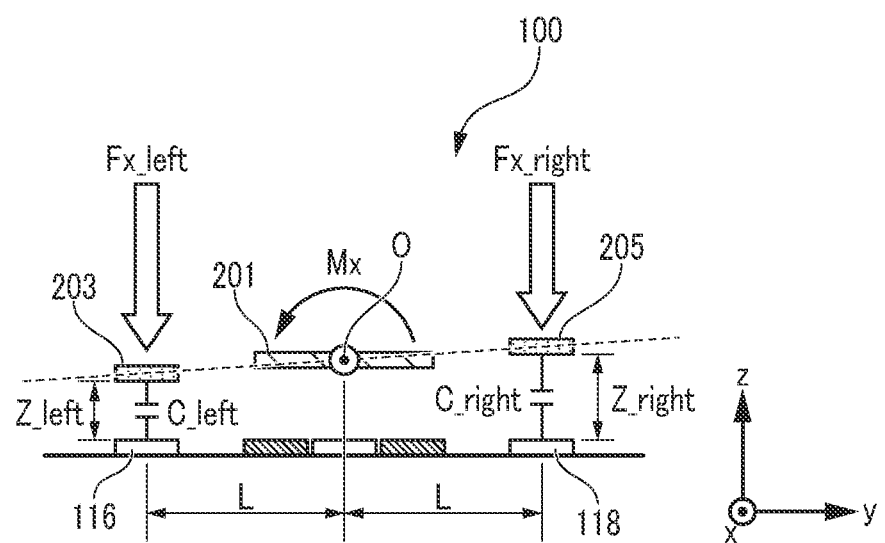
FIG. 13 is an explanatory diagram of a moment acting on the triaxial force sensor.

First, a principle of detecting the moment Mx around the x axis with the center O of the second electrode 201 in the left-right direction and the vertical direction as the center of rotation in cases where the x, y, and z axes are set such that the depth direction is on the positive value side of the x axis, the right direction is on the positive value side of the y axis, and the upper direction is on the positive value side of the z axis as shown in FIG. 13 will be described.

Here, when the capacitance between the second electrode 203 and the first electrode 116 is C_left, the dielectric constant is ε, the electrode area is S, and the inter-electrode distance is Z_left, the following equation (1) holds.

$$C\_left = \varepsilon \cdot (S/Z\_left) \quad (1)$$

Similarly, when the capacitance between the second electrode 205 and the first electrode 118 is C_right, the dielectric constant is ε, the electrode area is S, and the inter-electrode distance is Z_right, the following equation (2) holds.

$$C\_right = \varepsilon \cdot (S/Z\_right) \quad (2)$$

Further, when the downward force acting on the second electrode 203 side is Fx_left, the proportional coefficient is k, and the amount of change in capacitance C_left caused by the downward force Fx_left is ΔC_left, the following equation (3) holds.

$$Fx\_left = k \cdot \Delta C\_left \quad (3)$$

Similarly, when the downward force acting on the second electrode 205 is Fx_right, the proportional coefficient is k, and the amount of change in capacitance C_right caused by the downward force Fx_right is ΔC_right, the following equation (4) holds.

$$Fx\_right = k \cdot \Delta C\_right \quad (4)$$

Furthermore, since the length of the arm from the center O to the point of action is the above-described value L, the moment Mx can be calculated/detected by the following equation (5).

$$Mx = L \cdot (Fx\_left - Fx\_right) \quad (5)$$

Similarly to the above, according to the principle, it is also possible to calculate/detect the moment around the y-axis with the center of the second electrode 201 in the front-rear direction and the vertical direction as the center of rotation. Therefore, with the triaxial force sensor 100 according to the present embodiment, it is possible to detect moments around two axes in addition to the triaxial forces.

It should be noted that although the description is omitted, the triaxial force sensor 1 according to the first embodiment can also detect moments around two axes in addition to the triaxial forces by the same principle as described above.

Figure 14:
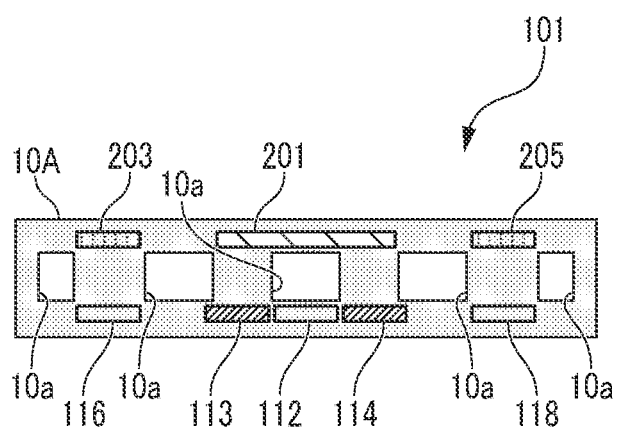
FIG. 14 shows a modification of the triaxial force sensor.

Further, the triaxial force sensor 100 according to the second embodiment is provided with the solid electrode support 10, but alternatively, as shown in FIG. 14, the triaxial force sensor 101 may be provided with the hollow electrode support 10A similarly to the triaxial force sensor 1A described above. The triaxial force sensor 101 is configured so that the first electrodes 111 to 122 and the second electrodes 201 to 209 are not short-circuited when a downward force acts. The triaxial force sensor 101 allows a further improvement in the detection sensitivity of shearing force than the triaxial force sensor 100 according to the second embodiment for the reasons described above.

Figure 15:
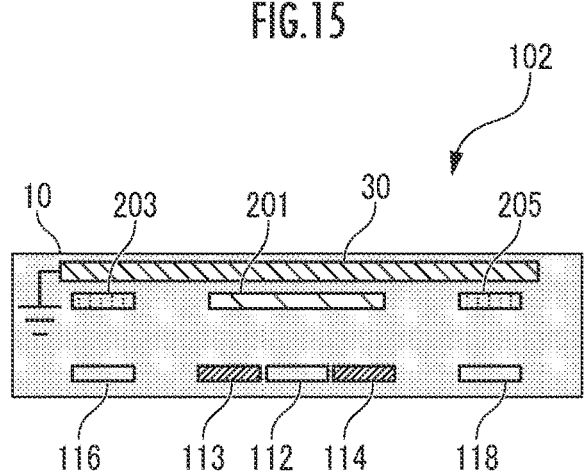
FIG. 15 shows the triaxial force sensor provided with a shield layer.

Further, a triaxial force sensor 102 may be configured as shown in FIG. 15. Similarly to the triaxial force sensor 1B described above, the triaxial force sensor 102 is provided with the shield layer 30, the effect of which can suppress the influence of external noise and improve the accuracy of triaxial force detection.

Figure 16:
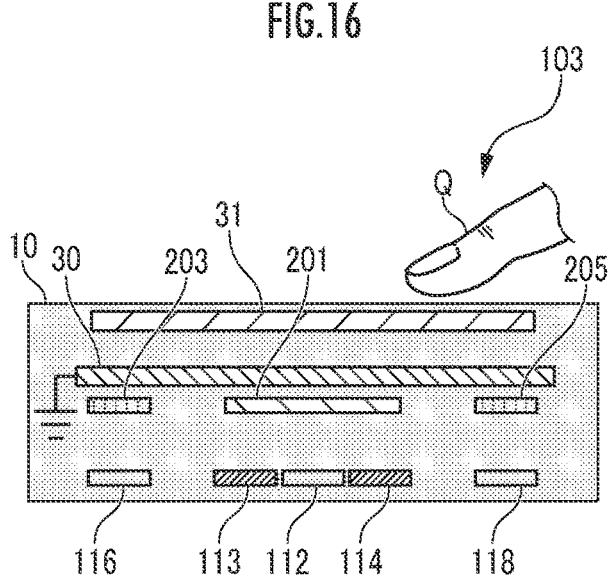
FIG. 16 shows the triaxial force sensor provided with an electrode for detecting the approach of an object.

Furthermore, a triaxial force sensor 103 may be configured as shown in FIG. 16. Similarly to the triaxial force sensor 1C described above, the triaxial force sensor 103 is also provided with the electrode 31 above the shield layer 30. Thus, with the triaxial force sensor 103, similarly to the triaxial force sensor 1C, it is possible to detect the approach of an object in addition to detecting the triaxial forces.

Figure 17:
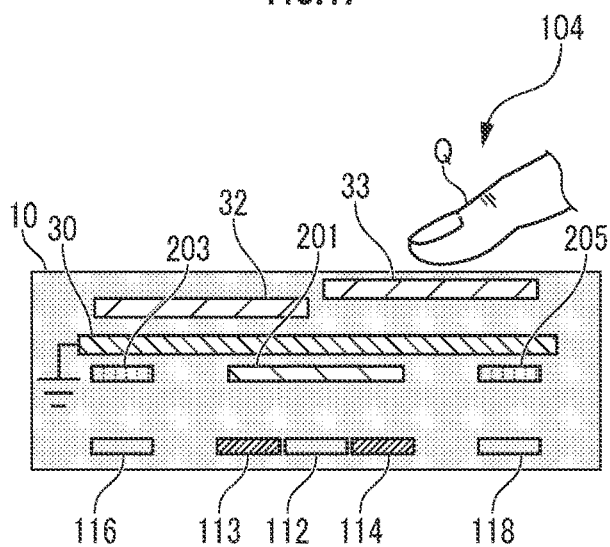
FIG. 17 shows the triaxial force sensor provided with two electrodes for detecting the approach of an object.

Further, a triaxial force sensor 104 may be configured as shown in FIG. 17. Similarly to the triaxial force sensor 1D described above, the triaxial force sensor 104 is also provided with the two electrodes 32 and 33 above the shield layer 30. Thus, with the triaxial force sensor 104, similarly to the triaxial force sensor 1D, it is possible to detect the approach of an object in addition to detecting the triaxial forces.

It should be noted that the second embodiment is an example in which the eight first electrodes 115 to 122 and the eight second electrodes 202 to 209 are square in plan view, but alternatively, polygonal ones other than square or circular ones in plan view may be used.

Further, the second embodiment is an example in which the four first electrodes 111 to 114 are square in plan view, but alternatively, the four first electrodes 111 to 114 that have a symmetrical shape in plan view may be used.

Furthermore, the second embodiment is an example in which the distance from the straight line L1 to the two second electrodes 202 and 203 and the distance from the straight line L1 to the two second electrodes 204 and 205 are the same, but these distances may be configured differently, and even in this case, the moment around the x-axis can be detected.

Similarly, in this example, the distance from the straight line L2 to the two second electrodes 206 and 207 and the distance from the straight line L2 to the two second electrodes 208 and 209 are the same, but these distances may be configured differently, and even in this case, the moment around the y-axis can be detected.

In addition, the second embodiment is an example in which eight first electrodes are used as a plurality of first peripheral electrodes, but alternatively, seven or fewer or nine or more first electrodes may be used as a plurality of first peripheral electrodes.

Furthermore, the second embodiment is an example in which eight second electrodes are used as a plurality of second peripheral electrodes, but alternatively, seven or fewer or nine or more second electrodes may be used as a plurality of second peripheral electrodes.

REFERENCE SIGNS LIST

1 Triaxial force sensor
1A to 1D Triaxial force sensor
10 Electrode support (flexible member)
10A Electrode support (flexible member)
11 to 14 First electrode (first peripheral electrode)
15 First electrode (first central electrode)
16 to 19 First electrode (first peripheral electrode)
21 to 24 Second electrode (second peripheral electrode)
25 Second electrode (second central electrode)
26 to 29 Second electrode (second peripheral electrode)
100 Triaxial force sensor
101 to 104 Triaxial force sensor
111 to 114 First electrode (one pair of first electrodes and other pair of first electrodes)
115 to 122 First electrode (first peripheral electrode)
201 Second electrode (second central electrode)
202 to 209 Second electrode (second peripheral electrode)
L1 First straight line
L2 Second straight line

What is claimed is:

1. A triaxial force sensor for detecting forces in orthogonal triaxial directions based on changes in capacitance between electrodes, the triaxial force sensor comprising:
   a flexible member having dielectric properties and elasticity;
   a plurality of first electrodes attached to the flexible member, the first electrodes being spaced apart from each other along a first predetermined plane; and
   a plurality of second electrodes spaced apart from each other along a second predetermined plane which is parallel to the first predetermined plane, disposed in spaced face-to-face relation to the plurality of first electrodes, and attached to the flexible member with the flexible member interposed between the second electrodes and the first electrodes, the second electrodes being configured to detect capacitances between the second electrodes and the first electrodes, wherein
   the plurality of first electrodes including one pair of the first electrodes and the other pair of the first electrodes different from the one pair of the first electrode,
   the plurality of the second electrodes is provided with a second central electrode located in a center when the plurality of the second electrodes is viewed toward the first electrodes, and a plurality of second peripheral electrodes arranged around the second central electrode,
   the plurality of the first electrodes is provided with the one pair of the first electrodes and the other pair of the first electrodes partially overlapping the second central electrode when the plurality of the first electrodes is viewed from the second electrode side, and a plurality of first peripheral electrodes facing the plurality of second peripheral electrodes, respectively,
   the one pair of the first electrodes being along a first straight line extending along the first predetermined plane, the one pair of the first electrodes being arranged so that when a force in a direction along the first straight line acts on the flexible member, and area of each of the one pair of the first electrodes overlapping the second central electrode when viewed from the second electrode side changes, and
   the other pair of the first electrodes being along a second straight line extending along the first predetermined plane while being orthogonal to the first straight line, the other pair of the first electrodes being arranged so that when a force in a direction along the second straight line acts on the flexible member, an area of each of the other pair of the first electrodes overlapping the second central electrode when viewed from the second electrode side changes.

2. The triaxial force sensor according to claim 1, wherein
the plurality of the second peripheral electrodes includes a pair of the second peripheral electrodes, and
the pair of the second peripheral electrodes are arranged along the second straight line with the first straight line between the pair of the second peripheral electrodes when viewed toward the plurality of the first peripheral electrodes.

\* \* \* \* \*